| United States Patent [19] | [11] 3,876,717 |
| Duck et al. | [45] Apr. 8, 1975 |

[54] CYCLOPENTENE PREPARATION

[75] Inventors: Edward William Duck; Richard Hawkins, both of Southampton, England

[73] Assignee: The International Synthetic Rubber Company, Limited, Southampton, Hampshire, England

[22] Filed: Feb. 14, 1972

[21] Appl. No.: 226,125

[30] Foreign Application Priority Data

Feb. 19, 1971 United Kingdom............... 4992/71

[52] U.S. Cl............................................ 260/666 A
[51] Int. Cl............................................. C07c 5/00
[58] Field of Search............................... 260/666 A

[56] References Cited
UNITED STATES PATENTS

| 3,205,278 | 9/1965 | Lapporte................. 252/431 C |
| 3,340,315 | 9/1967 | Renner..................... 260/666 A |
| 3,472,763 | 10/1969 | Cosyns et al................. 208/255 |
| 3,531,445 | 9/1970 | Yoshimoto et al............. 252/431 C |
| 3,541,064 | 11/1970 | Yoshimoto et al............. 252/431 C |
| 3,565,963 | 2/1971 | Tabler et al.................. 260/666 A |

Primary Examiner—Veronica O'Keefe
Attorney, Agent, or Firm—Cushman, Darby & Cushman

[57] ABSTRACT

A process for the preparation of cyclopentene characterized in that cyclopentadiene is selectively hydrogenated to clyclopentene at a temperature of up to 100°C and at a presence of less than 5 atmospheres absolute in the presence of a catalyst comprising a. a hydrocarbon-soluble compound of nickel, and
b. an alkyl, aryl or aralkyl compound of a Group IA, IIA, or IIIA metal.

23 Claims, 1 Drawing Figure

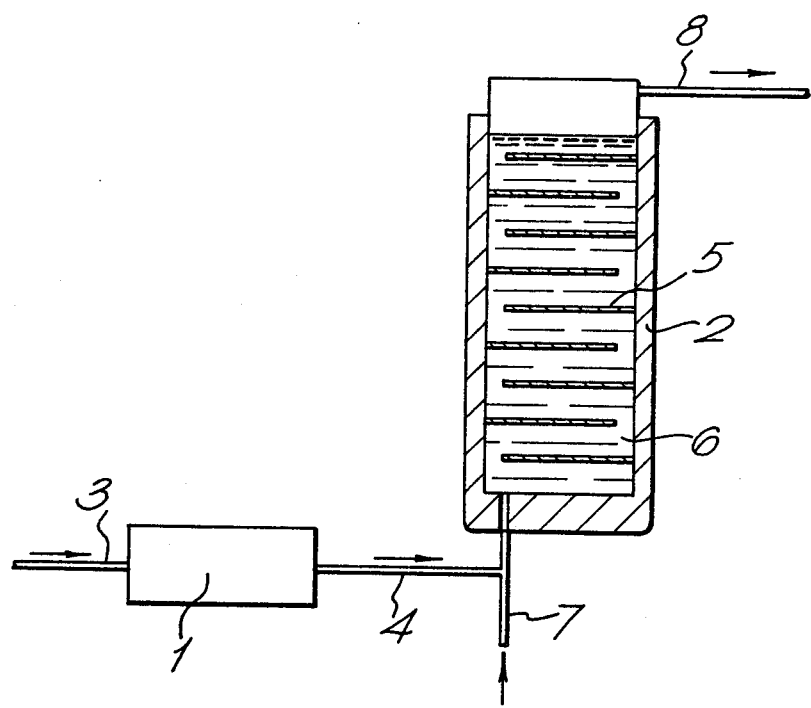

CYCLOPENTENE PREPARATION

This invention relates to the preparation of cyclopentene.

Cyclopentene has recently become of importance as a monomer for the preparation of cyclopentene polymers known as polypentenamers. However, since it is relatively expensive, the final polymers are themselves expensive. One object of the present invention is to provide a process for preparing cyclopentene from readily available starting materials thus offering economic advantages, particularly in the preparation of cyclopentene polymers.

We have now devised a process for preparing cyclopentene from cyclopentadiene. Cyclopentadiene is a by-product from refinery hydrocarbon streams based on compounds having five carbon atoms which has relatively few uses and hence may be obtained inexpensively. Since it readily dimerises it is usually available as dicyclopentadiene which may be converted back to the monomeric form, cyclopentadiene, by simple cracking (heat treatment). Special measures such as low temperature storage have to be employed to maintain cyclopentadiene in this monomeric form.

According to the present invention cyclopentadiene is selectively hydrogenated to cyclopentene at a temperature of not greater than 100°C and at a pressure of less than 5 atmospheres absolute in the presence of a catalyst comprising:

a. a hydrocarbon-soluble compound of nickel, and
b. an alkyl, aryl or aralkyl compound of a Group IA, IIA or IIIA metal.

The selective hydrogenation process of the present invention is preferably continuous.

The hydrocarbon-soluble compound of nickel used in the process of the invention is preferably a nickel organic compound, one in which the organic part or parts is/are bound to the nickel atom through an oxygen or sulphur atom being preferred. Examples of such compounds are those of formula $(R\ COO)_2\ Ni$ where R is a hydrocarbon or substituted-hydrocarbon radical, e.g., alkyl, aryl, or aralkyl, which may be substituted with, e.g., hydroxyl, thiol or halogen. Examples are nickel 2 — ethyl hexoate, and nickel diisopropyl 2 — thiol benzoate. Nickel complex compounds prepared, for example, by the reaction in an aqueous medium at room temperature of nickel salts with alkali salts of aromatic carboxylic acids which are substituted in the aryl nucleus by one or more —OH and/or —SH groups (particularly where one substituent group is ortho to the carboxyl group), are especially preferred. Examples of these are nickel diisopropyl salicylates, nickel 3,5 - ditert butyl salicylate, and other nickel salts of dialkyl hydroxy benzoic acid. The compound of nickel is soluble in hydrocarbon, particularly paraffinic and/or alicyclic, and/or aromatic hydrocarbons, i.e., it may readily be dissolved at ambient or slightly elevated temperatures (e.g., 10° to 40°C) in quantities sufficient for catalytic activity with no insoluble residue remaining.

The alkyl, aryl or aralkyl compound of a Group IA, IIA or IIIA metal is preferably of lithium or aluminum. Desirably it has hydrocarbyl groups having no more than eight carbon atoms, although hydrocarbyl groups having up to, e.g., 40 carbon atoms may be used. Examples of lithium compounds are methyl lithium, ethyl lithium, butyl lithium, amyl lithium, phenyl lithium and benzyl lithium. Examples of aluminum compounds are triisobutyl aluminum, triethyl aluminum, diisobutyl aluminum hydride, and diethyl aluminum hydride, and diethyl aluminum butoxide. Lithium butyl and triisobutyl aluminum are examples of very suitable compounds.

The selective hydrogenation is preferably carried out in the liquid phase in which case a hydrocarbon, particularly a paraffinic, alicyclic, or aromatic hydrocarbon solvent of high boiling point, (e.g., greater than 100°C), or a mixture of such hydrocarbons is used. Alternatively the catalyst components may be deposited on a particulate support, conveniently from a hydrocarbon solution of each, and the reaction carried out under fluid bed conditions. Examples of suitable solvents for liquid phase hydrogenation are saturated liquid hydrocarbons having 7 to, e.g., 14 carbon atoms, such as octane, Decalin or paraffin oil. Aromatic solvents such as toluene or xylene are less suitable since under some conditions the carbon — carbon double bonds may themselves be hydrogenated. In the case of liquid phase hydrogenation, the reaction is conveniently effected in a heated vertical column containing the catalyst components and the solvent. The temperature of the column is up to 100°C, usually 50° to 70°C, conveniently 60°C. The temperature and flow rate of reactants are selected so that as high a proportion as possible of the formed cyclopentene distills off with a minimum proportion of other hydrocarbons whilst maintaining a satisfactory reaction rate. Care must also be taken to minimize dimerization of cyclopentadiene at elevated temperatures. The reaction temperature selected is therefore determined by these factors. The reaction pressure is less than 5 atmospheres absolute, e.g., 1 to 3 atmospheres absolute, particularly atmospheric pressure.

Hydrogen is fed to the reactor in molar excess with respect to cyclopentadiene, the flow rate depending on the flow rate of the cyclopentadiene feed. The flow rate of each may be adjusted within wide limits, although for maximum economy the flow rate of the cyclopentadiene should be as high as possible consistent with column capacity.

The molar ratio of the catalyst components (b):(a), may be for example, 0.5:1 to 20:1, ratios in the range 1:1 to 6:1 being preferred. Variation of the molar ratio (b):(a) may affect the hydrogenation rate, the exact ratio used depending on the compound which is used as component (b) of the catalyst. The absolute concentration of each must be sufficient to ensure that hydrogenation occurs at a suitable rate, concentrations of for example 6 grams per litre (in the case of nickel diisopropyl salicylate dihydrate) being very suitable.

The hydrogenation reaction is carried out in the substantial absence of air, oxygen, moisture and any other impurities which would tend to deactivate the catalyst unless special precautions, e.g., scavenging, are taken to minimize such deactivation.

It is preferred to prepare a hydrocarbon solution of the catalyst components initially and to contact this with hydrogen for a period preferably of at least 1 day, whilst maintaining the hydrogen pressure. The aged catalyst may then be added to the reaction vessel containing the hydrocarbon solvent, as required.

A preferred process for preparing cyclopentene from dicyclopentadiene is continuous. Such a continuous process is now described with reference to the accompanying diagrammatic drawing wherein a dicyclopentadiene cracker unit 1, is directly linked to a hydrogenation unit 2. The cracker unit 1 may be for example a stirred reactor containing a high boiling liquid, e.g., silicone or paraffin oil, at a temperature of, e.g., 240°C. Dicyclopentadiene (DCPD) preferably substantially free of oxygen, moisture and sulphur, is metered via a conduit 3 into this cracker unit 1 wherein cyclopentadiene (CPD) monomer is formed which vaporizes. The cyclopentadiene, is collected and passed directly via conduit 4 to the base of hydrogenation unit 2, equipped with baffles 5, which is heated and which contains the hydrogenation catalyst preferably as a homogeneous solution 6, in, for example, dry octane at the desired hydrogenation temperature, e.g., 60°C, suitably at atmospheric pressure. Hydrogen is fed via conduit 7 into the base of the hydrogenation unit 2, separately or admixed with the cyclopentadiene, so as to obtain a satisfactory hydrogenation rate. The product from the top of the hydrogenation unit 2 is collected by means of conduit 8, condensed and analyzed by, for example, gas-liquid chromatography.

Appropriate adjustments may then be made to the hydrogenation conditions (e.g., reactant feed rates, temperature and catalyst concentration) to obtain optimum cyclopentene concentration in the product. Desirably the cyclopentadiene concentration in the product is less than 1%, and if the cyclopentene is to be polymerized, is preferably 100 p.p.m. or less. Very desirably the cyclopentadiene content is zero. However, where the cyclopentadiene content cannot be reduced to such low levels by adjustment of the hydrogenation conditions, a purification stage (for example dimerization and fractional distillation) may be required. A small percentage of the formed cyclopentene may, under certain conditions, be further hydrogenated to cyclopentane. In many cases however cyclopentane, being a fully saturated hydrocarbon, does not interfere with subsequent reactions and therefore it need not be removed unless pure (i.e., substantially 100%) cyclopentene is required. Such formation of cyclopentane is in most cases undesirable, since it reduces the yield of cyclopentene, and therefore it is usual to adjust the hydrogenation conditions to reduce the cyclopentane content to 20% or less, preferably 10% or less. Under optimum conditions the percentage cyclopentene in the product is therefore at least 80%, preferably 90% or more with a low, preferably less than 1%, cyclopentadiene content, the balance being substantially cyclopentane.

Some preferred embodiments in accordance with the present invention will now be described by way of example.

EXAMPLE 1

Dicyclopentadiene is distilled under vacuum in the presence of aluminum triisobutyl as scavenger to remove impurities. It is purged with dry nitrogen and passed at a controlled rate to a stirred reactor containing paraffin oil at approximately 240°C. Under equilibrium conditions the cyclopentadiene formed vaporizes and is removed at the same rate as the dicyclopentadiene is supplied to the reactor.

The cyclopentadiene formed is passed directly to a vertical hydrogenation column of the kind described above containing octane and the hydrogenation catalyst. The hydrogenation catalyst is prepared separately in dried octane and contains nickel 3,5-diisopropyl salicylate dihydrate (Ni dips) and butyl lithium in the molar ratio of 1:5. The catalyst solution is maintained under hydrogen for 26 hours prior to use. The catalyst concentration in the hydrogenation column is approximately 6 g. of Ni dips per liter of octane, and the solution (approximately 800 ml) is maintained at 60°C. Hydrogen is supplied to the column at a rate of 800 mls (at N.T.P.) per minute and hydrogenation proceeds at atmospheric pressure, the hydrogen being absorbed at a rate of 400 mls (at N.T.P.) per minute. The product in the form of vapor from the top of the column is condensed and collected. The results at varying dicyclopentadiene flow rates at equilibrium are:

| Dicyclopentadiene flow rate mls/hour | Cyclopentene % | CPD % | Cyclopentane % | Octane % |
|---|---|---|---|---|
| 100 | 86.0 | 4.1 | 9.0 | 0.9 |
| 80 | 82.8 | 1.5 | 14.6 | 1.1 |
| 60 | 75.4 | 0.8 | 22.7 | 1.1 |

EXAMPLE 2

Cyclopentadiene formed as described above from dicyclopentadiene at a flow rate of 85 mls. per hour is passed directly to a hydrogenation column as in Example 1 containing octane and hydrogenation catalyst (total volume 800 mls) at atmospheric pressure. The catalyst comprises nickel dips (12g.) and aluminum triisobutyl (17 mls.) prepared in octane and aged for 24 hours under hydrogen. Hydrogen is supplied to the hydrogenation column as before and, at equilibrium, is absorbed at a rate of 400 mls (at N.T.P.) per minute. The residence time of the cyclopentadiene in the reactor is approximately 2 hours.

The process is run continuously for 18 hours and samples of the product are taken every 2 hours, each sample being collected over a half hour period.

The samples are analyzed by gas liquid chromatography and the results obtained are:

| TIME (HRS) | PRODUCT (%) | | | |
|---|---|---|---|---|
| | Cyclopentene | CPD | Cyclopentane | OCTANE |
| 2 | 94.8 | 2.1 | 2.1 | 0.9 |
| 4 | 81.9 | 200ppm | 16.0 | 0.9 |
| 6 | 81.9 | 150ppm | 17.1 | 0.9 |
| 8 | 94.4 | 0.8 | 3.7 | 1.0 |
| 10 | 82.6 | 500ppm | 15.5 | 1.1 |
| 12 | 87.3 | 1.5 | 9.6 | 1.0 |
| 14 | 85.0 | 1.0 | 12.9 | 1.0 |
| 16 | 90.0 | 0.5 | 7.5 | 0.9 |
| 18 | 83.9 | 200ppm | 15.9 | 0.8 |

What is claimed is:

1. A process for the preparation of cyclopentene characterized in that cyclopentadiene is selectively hydrogenated to cyclopentene at a temperature of up to 100°C. and at a pressure of less than 5 atmospheres absolute in the presence of a catalyst comprising:
   a. the nickel salt of a dialkyl hydroxy benzoic acid, and
   b. an alkyl lithium, phenyl lithium, benzyl lithium, trialkyl aluminum, dialkyl aluminum hydride or dialkyl aluminum butoxide.

2. A process according to claim 1 wherein the cyclopentadiene is continuously selectively hydrogenated.

3. A process according to claim 1 wherein (a) is nickel diisopropyl salicylate.

4. A process according to claim 1 wherein (b) is selected from methyl lithium, ethyl lithium, butyl lithium, amyl lithium, phenyl lithium and benzyl lithium.

5. A process according to claim 1 wherein (b) is selected from triisobutyl aluminum, triethyl aluminum, diisobutyl aluminum hydride, and diethyl aluminum butoxide.

6. A process according to claim 1 wherein the hydrogenation is carried out in the liquid phase in a saturated liquid hydrocarbon having 7 to 14 carbon atoms.

7. A process according to claim 1 wherein the hydrogenation is carried out at a temperature of 50° to 70°C.

8. A process according to claim 1 wherein the hydrogenation is carried out at atmospheric pressure.

9. A process according to claim 1 wherein the temperature and flow rate of reactants is selected such that the product contains at least 80% of cyclopentene.

10. A process according to claim 1 wherein the molar ratio of (b):(a) is 0.5:1 to 20:1.

11. A process according to claim 10 wherein the molar ratio of (b):(a) is 1:1 to 6:1.

12. A process according to claim 1 wherein a hydrocarbon solution of the catalyst components is prepared, the solution is contacted with hydrogen for a period of at least 1 day whilst maintaining the hydrogen pressure, and the aged catalyst solution is then used for the hydrogenation.

13. A process according to claim 1 wherein the hydrogenation is carried out at a temperature of 50° to 100°C.

14. A process according to claim 13 wherein the catalyst consists essentially of (a) and (b).

15. A process according to claim 1 wherein the catalyst consists essentially of (a) and (b).

16. A process according to claim 1, wherein (a) is nickel 3, 5-di-tert butyl salicylate.

17. A process according to claim 1 wherein (b) is an alkyl lithium, trialkyl aluminum, dialkyl aluminum hydride or dialkyl aluminum butoxide and the catalyst consists of (a) and (b).

18. A process according to claim 17 wherein (b) is an alkyl lithium.

19. A process according to claim 18 wherein (a) is nickel 3,5-diosopropyl salicylate.

20. A process according to claim 19 wherein (b) is butyl lithium.

21. A process according to claim 17 wherein (b) is trialkyl aluminum.

22. A process according to claim 18 wherein (a) is nickel 3,5-diisopropyl salicylate.

23. A process according to claim 22 wherein (b) is aluminum triisobutyl.

* * * * *